United States Patent
Hong (10) Patent No.: US 11,052,965 B2
(45) Date of Patent: Jul. 6, 2021

(54) BICYCLE

(71) Applicant: Seok Su Hong, Seoul (KR)

(72) Inventor: Seok Su Hong, Seoul (KR)

( * ) Notice: Subject to any disclaimer, the term of this patent is extended or adjusted under 35 U.S.C. 154(b) by 283 days.

(21) Appl. No.: 16/325,383

(22) PCT Filed: Aug. 14, 2017

(86) PCT No.: PCT/KR2017/008816
§ 371 (c)(1),
(2) Date: Feb. 13, 2019

(87) PCT Pub. No.: WO2018/034466
PCT Pub. Date: Feb. 22, 2018

(65) Prior Publication Data
US 2019/0210689 A1    Jul. 11, 2019

(30) Foreign Application Priority Data

Aug. 17, 2016  (KR) .......................... 10-2016-0104575
Aug. 7, 2017   (KR) .......................... 10-2017-0099712

(51) Int. Cl.
*B62M 1/26* (2013.01)
*B62M 3/08* (2006.01)
*B62M 1/28* (2013.01)

(52) U.S. Cl.
CPC ............... *B62M 1/26* (2013.01); *B62M 1/28* (2013.01); *B62M 3/08* (2013.01); *B60Y 2200/13* (2013.01)

(58) Field of Classification Search
CPC . B62M 1/26; B62M 3/08; B62M 1/28; B62M 3/00; B60Y 2200/13
See application file for complete search history.

(56) References Cited

U.S. PATENT DOCUMENTS

| 4,227,712 A | * | 10/1980 | Dick ........................ B62M 1/28 |
| | | | 280/236 |
| 8,979,107 B2 | * | 3/2015 | Lin .......................... B62M 1/26 |
| | | | 280/252 |

(Continued)

FOREIGN PATENT DOCUMENTS

| EP | 0943536 A3 | 9/1999 |
| JP | H11-079056 A | 3/1999 |

(Continued)

*Primary Examiner* — Minnah L Seoh
*Assistant Examiner* — Marlon A Arce
(74) *Attorney, Agent, or Firm* — KORUS Patent, LLC; Seong Il Jeong (57) ABSTRACT

A bicycle according to the present invention includes: a body configured such that a saddle and handlebars are disposed on a frame; a front wheel and a rear wheel disposed on the front and rear sides of the body, respectively; a pair of first driven units disposed on one side and remaining side of the rear wheel, respectively, and mounted around a rotating shaft; a pair of power generation units disposed on the one side and remaining side of the rear wheel, respectively, and mounted around the rotating shaft to be rotatable in upward and downward directions; and power transfer units disposed on the one side and remaining side of the rear wheel, respectively, connected to the first driven units and the power generation units, and configured to, when the power generation units are rotated, be rotated and transfer rotating power to the first driven units.

7 Claims, 8 Drawing Sheets

(56) References Cited

U.S. PATENT DOCUMENTS

| | | | |
|---|---|---|---|
| 9,260,156 B2 * | 2/2016 | Brewer | B62M 1/24 |
| 10,875,599 B2 * | 12/2020 | Kipnis | B62M 6/00 |
| 2006/0055144 A1 * | 3/2006 | Norman | B62M 1/28 |
| | | | 280/251 |
| 2010/0320720 A1 * | 12/2010 | Bezerra | B62M 1/30 |
| | | | 280/252 |
| 2014/0367940 A1 | 12/2014 | Lin | |
| 2017/0050699 A1 * | 2/2017 | Bezzera | B62M 1/14 |

FOREIGN PATENT DOCUMENTS

| | | |
|---|---|---|
| KR | 10-1228803 B1 | 1/2013 |
| KR | 10-2016-0092700 A | 8/2016 |
| WO | 2014/096470 A1 | 6/2014 |

* cited by examiner

BICYCLE

TECHNICAL FIELD

The present invention relates to a bicycle, and more specifically to a bicycle that enables a rear wheel and a front wheel to be easily rotated using the principle of the lever, thereby being run.

BACKGROUND ART

Generally, a bicycle transfers the rotating force of pedals to a rear wheel by using a chain and sprocket. Accordingly, it is common to allow a bicycle to be propelled. Such a bicycle is configured to transfer power by using a chain.

The above-described bicycle is equipped with a separate transmission in order to prevent driving force from being decreased because the bicycle travels in a rear wheel-drive manner, thereby enabling the bicycle to be easily driven even with a small amount of force and thus improving driving force.

However, the rear wheel-drive system is problematic in that low driving force is obtained only by the transmission of driving force via the pedals even when the transmission is installed and in that a large amount of force is required from a user when high propelling force is required.

Related art documents in the art to which the present invention pertains include Korean Patent No. 10-1228803, etc.

DISCLOSURE

Technical Problem

The present invention has been conceived to overcome the above-described problems, and an object of the present invention is to provide a bicycle that enables a rear wheel and a front wheel to be rotated even with a small amount of force by using the principle of the lever, thereby enabling not only common adults but also the elderly, women, and children, who are relatively weak in force, to easily use it.

Technical Solution

According to the present invention, there is provided a bicycle, including: a body configured such that a saddle and handlebars are disposed on a frame; a front wheel and a rear wheel disposed on the front and rear sides of the body, respectively; a pair of first driven units disposed on one side and remaining side of the rear wheel, respectively, and mounted around a rotating shaft axially fastened into the rear wheel; a pair of power generation units disposed on the one side and remaining side of the rear wheel, respectively, and mounted around the rotating shaft to be rotatable in upward and downward directions; and power transfer units disposed on the one side and remaining side of the rear wheel, respectively, connected to the first driven units and the power generation units, and configured to, when the power generation units are rotated in the downward directions, be rotated and transfer rotating power to the first driven units.

Additionally, each of the power transfer units includes: a housing disposed to be spaced apart from the rear wheel by a predetermined distance and formed such that one side thereof is open and an empty space is formed therein; a power transfer shaft disposed to pass through the center portion of the housing; a second driven unit mounted around one side of the power transfer shaft, and configured to be connected to a corresponding one of the first driven units via a connection member and to transfer rotating force to the first driven unit; a drive unit mounted around the remaining side of the power transfer shaft; and a rotation drive unit connected to the drive unit and the power generation unit, and configured to, when the power generation unit is rotated in the downward direction, rotate the drive unit, thereby enabling the power transfer shaft, the second driven unit, the first driven unit, the rotating shaft, and the rear wheel to be rotated.

Furthermore, the power transfer unit further includes a return unit accommodated in the inner space of the housing, wound around the external surface of the power transfer shaft in a coil form, and configured to, when the power transfer shaft is rotated in response to the downward rotation of the power generation unit, return the power transfer shaft and the power generation unit to their original states.

Additionally, a first fastening member configured to pass through and be fastened into the inner end of the return unit is formed on the external surface of the power transfer shaft, and a second fastening member configured to be inserted into a ring formed at the outer end of the return unit is formed in the inner space of the housing.

Furthermore, coupling plates disposed on the one side and remaining side of the rear wheel and coupled to corresponding surfaces of the housings are formed on the body, accommodation depressions and through holes configured such that the power transfer shafts pass therethrough are formed in the housings and the coupling plates, respectively, and bearings configured to guide the power transfer shaft through movement in place are accommodated in the accommodation depressions of the housings and the coupling plates.

Additionally, the second driven unit is formed to have a larger diameter than the first driven units in order to increase the RPM and rotation speed of the first driven units.

Furthermore, pedal coupling portions configured such that pedals are coupled thereto are formed at one-side ends of the power generation units, and each of the pedals includes: an upper pedal configured such that it is disposed over the pedal coupling portion and a semicircular groove that surrounds an upper part of the pedal coupling portion is formed in the bottom surface thereof; and a lower pedal configured such that it is disposed under the pedal coupling portion, a semicircular groove that surrounds a lower part of the pedal coupling portion is formed in a top surface thereof, and it is coupled to the upper pedal via a coupling device.

Additionally, the bicycle further includes a rotation range limiting unit configured to limit the upward and downward rotation range of the power generation units, and the rotation range limiting unit includes: a rotation guide coupled to the body and located between the power generation units; horizontal bars configured to protrude from corresponding sides of the power generation units and to face the rotation guide; and elevation control members each configured to include two members disposed on each of the horizontal bars, configured to come into contact with inner and outer surfaces of the rotation guide, and configured to, when the power generation units are rotated in the upward and downward directions, come into contact with a top or bottom surface of the rotation guide while being selectively elevated and lowered along the rotation guide, thereby limiting the selective elevation and lowering of the power generation units.

Furthermore, the elevation control members are coupled to the horizontal bars to be rotatable in place, and the elevation control members are made of rubber or silicon material in order to prevent noise that is generated in a process in which the elevation control members are selectively elevated and lowered along the frame and in a case in which the elevation control members come into contact with a ceiling or bottom surface of the frame.

Advantageous Effects

The bicycle according to the present invention has the effect of rotating the rear wheel and the front wheel through the operation of alternately or simultaneously rotating the power generation units, located on the right and left sides of the body, respectively, in downward directions, thereby being run.

Furthermore, the bicycle can be run by means of the principle of the lever, thereby providing the effect of improving the convenience of use, such as enabling not only common adults but also the elderly, women, and children, who are relatively weak in force, to use it.

Furthermore, the second driven units configured to transfer rotating force to the first driven units have a larger diameter than the first driven units connected to the rear wheel, and thus the RPM and rotation speed of the rear wheel can be increased by performing pedaling a small number of times, thereby providing the effect of increasing the traveling speed of the bicycle within a short period of time.

Moreover, high propelling force can be generated at the rear wheel by performing pedaling a small number of times, thereby providing the effect of enabling a user to easily run the bicycle on a slope as well as on a flatland without a large amount of force.

MODE FOR INVENTION

The advantages and features of the present invention and methods for achieving the advantages and the features will be apparent from embodiments that will be described in detail below in conjunction with the accompanying drawings.

However, the present invention is not limited to the embodiments disclosed below, but may be implemented in various different forms. The present embodiments are provided merely to make the disclosure of the present invention complete and to fully convey the scope of the present invention to those having ordinary knowledge in the art to the present invention pertains. The present invention is defined only by the scope of the attached claims. Throughout the specification, the same reference symbols designate the same components.

Embodiments of the present invention will be described in detail below with reference to the accompanying drawings so that those having ordinary knowledge in the art to which the present invention pertains can easily practice the present invention. However, the present invention may be implemented in various different forms, and is not limited to the embodiments described herein. Throughout the specification, similar parts are assigned the same reference symbols.

Figure 1:
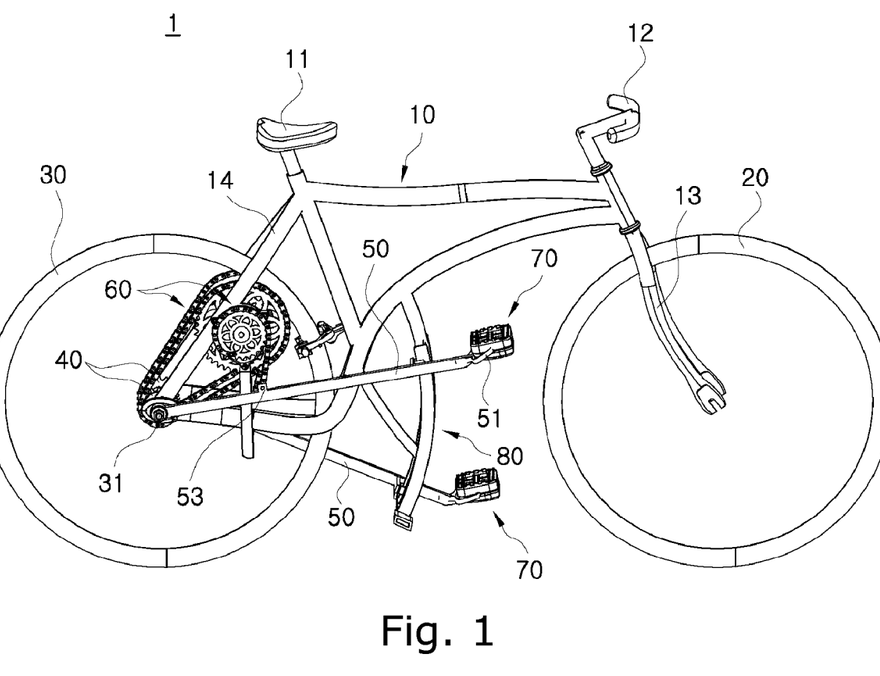
FIG. 1 is a perspective view showing a bicycle according to the present invention.
Figure 2:
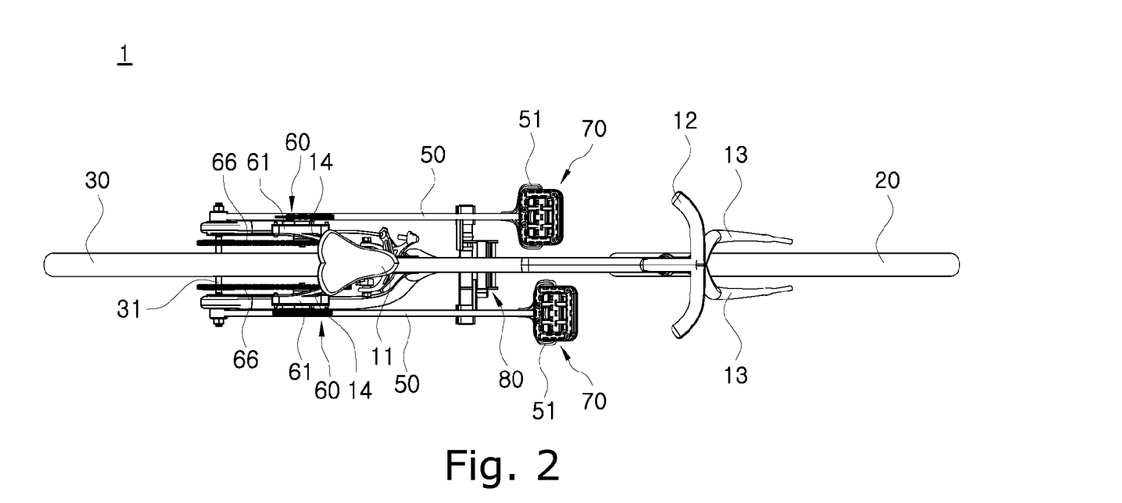
FIG. 2 is a plan view showing the bicycle according to the present invention.
Figure 3:
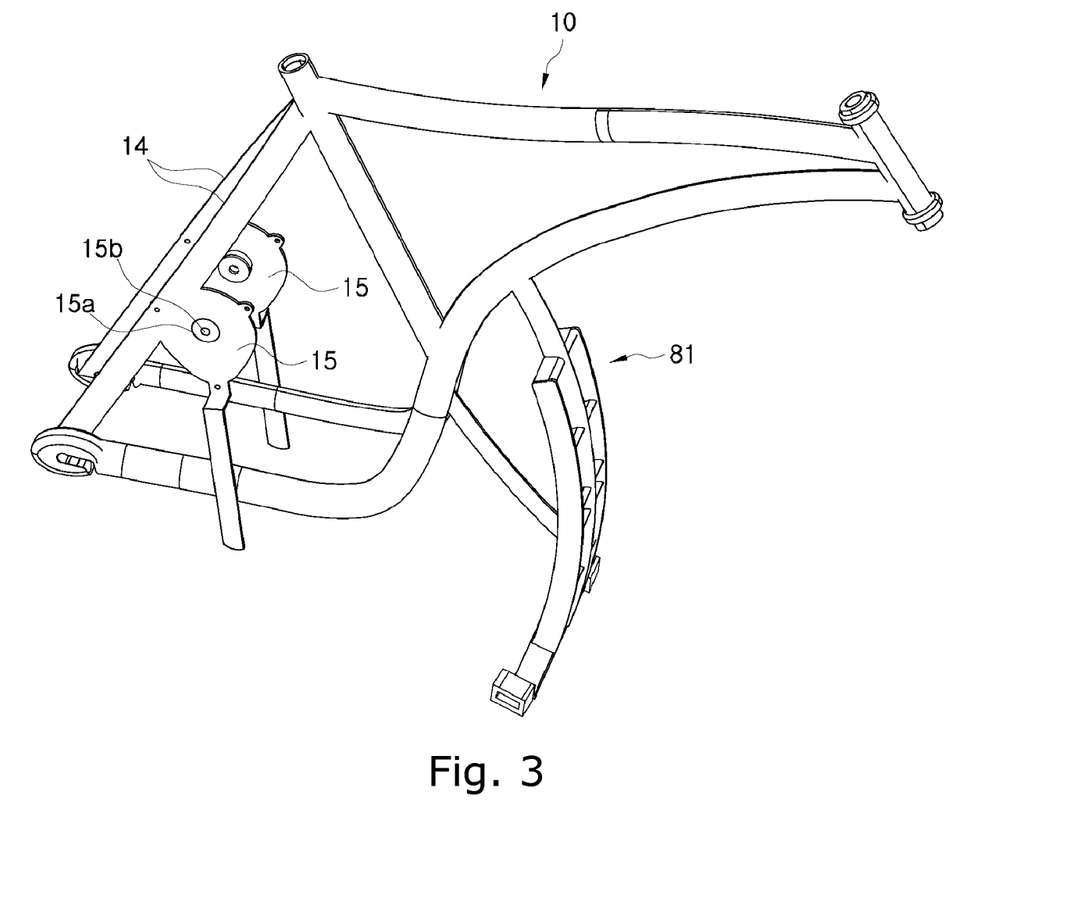
FIG. 3 is a perspective view showing a body applied to the bicycle according to the present invention.
Figure 4:
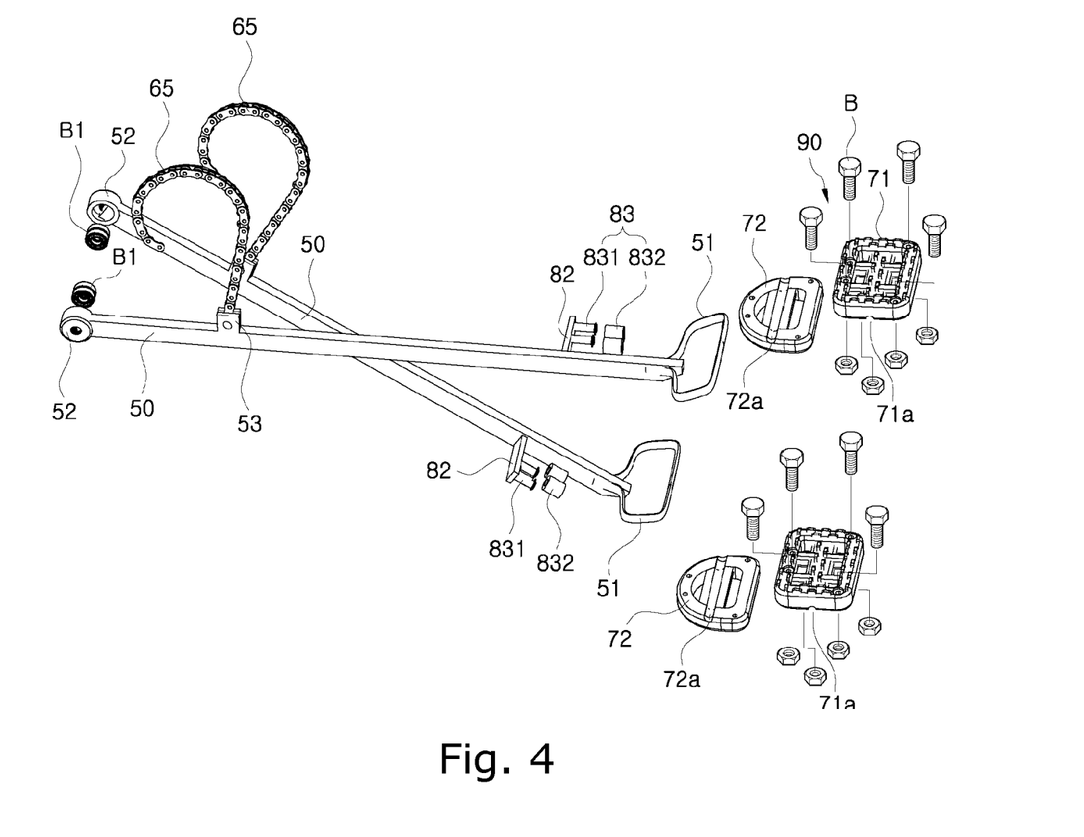
FIG. 4 is an exploded perspective view showing power generation units and pedals applied to the bicycle according to the present invention.
Figure 5:
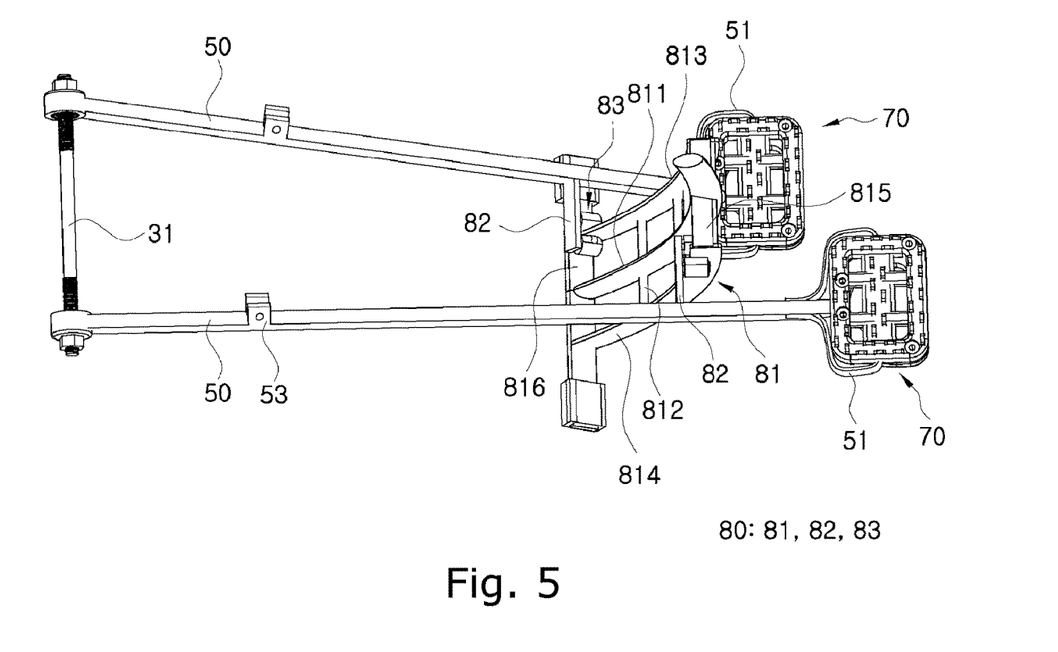
FIG. 5 is an assembled perspective view showing the power generation units and the pedals applied to the bicycle according to the present invention.
Figure 6:
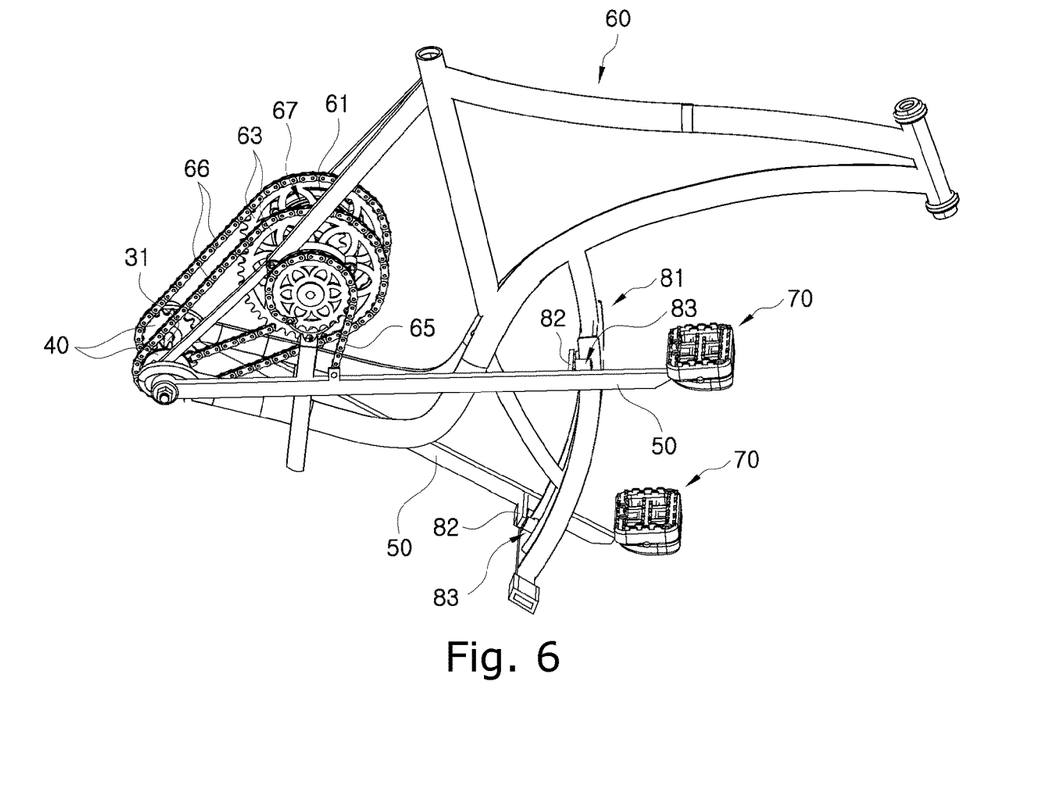
FIG. 6 is a perspective view showing a state in which the power generation units and power transfer units applied to the bicycle according to the present invention are coupled to the body.
Figure 7:
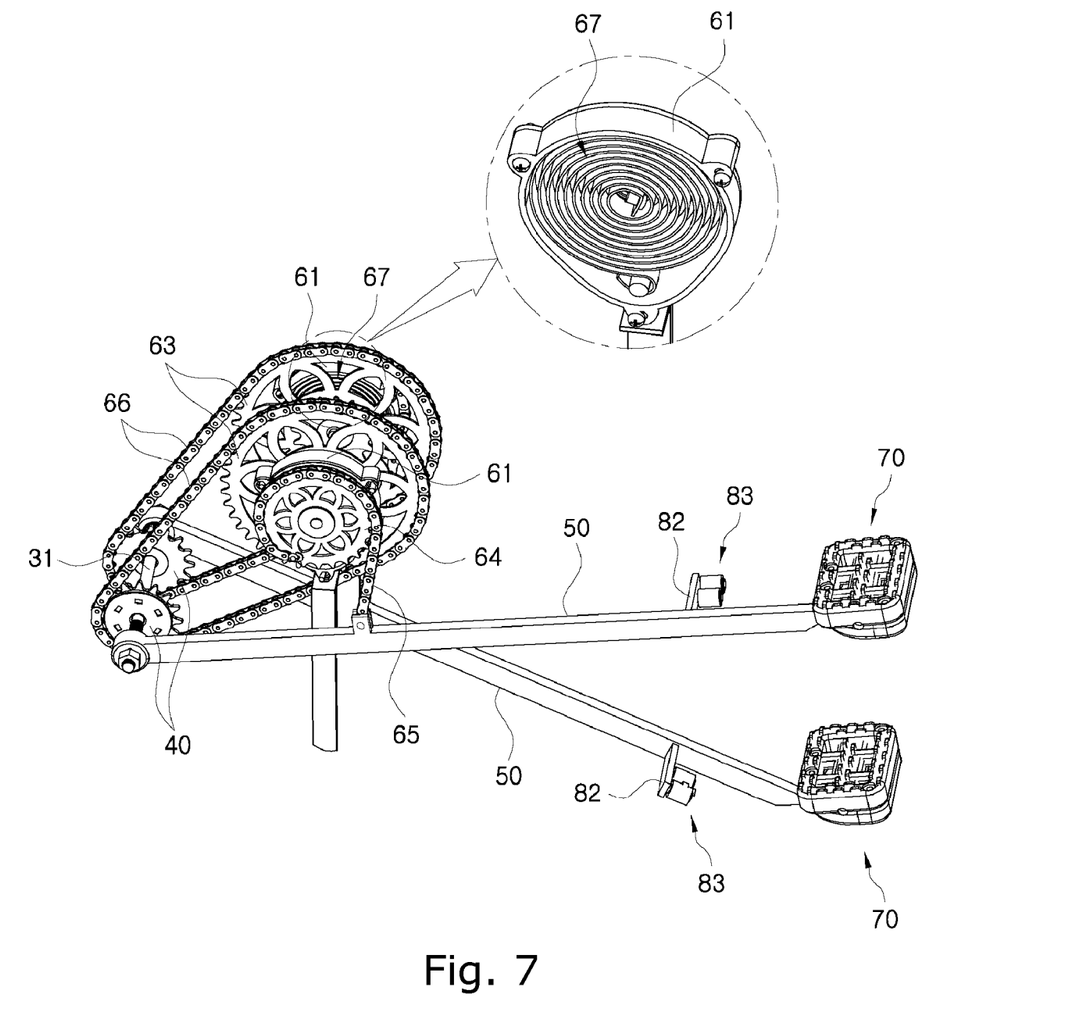
FIG. 7 is a perspective view showing a state in which the power generation units and the power transfer units applied to the bicycle according to the present invention are coupled to one another.
Figure 8:
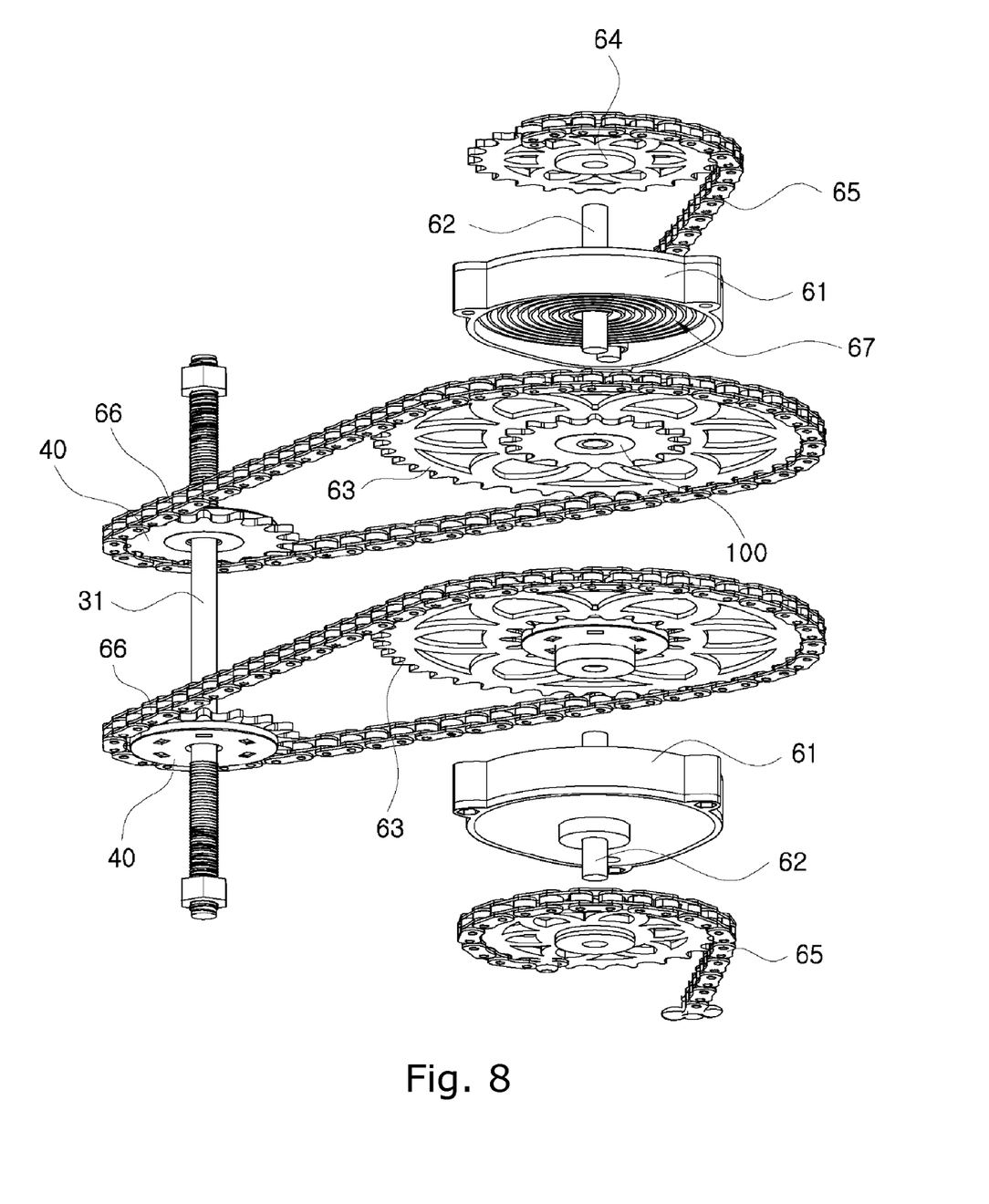
FIG. 8 is an exploded perspective view showing the power transfer units applied to the bicycle according to the present invention.
Figure 9:
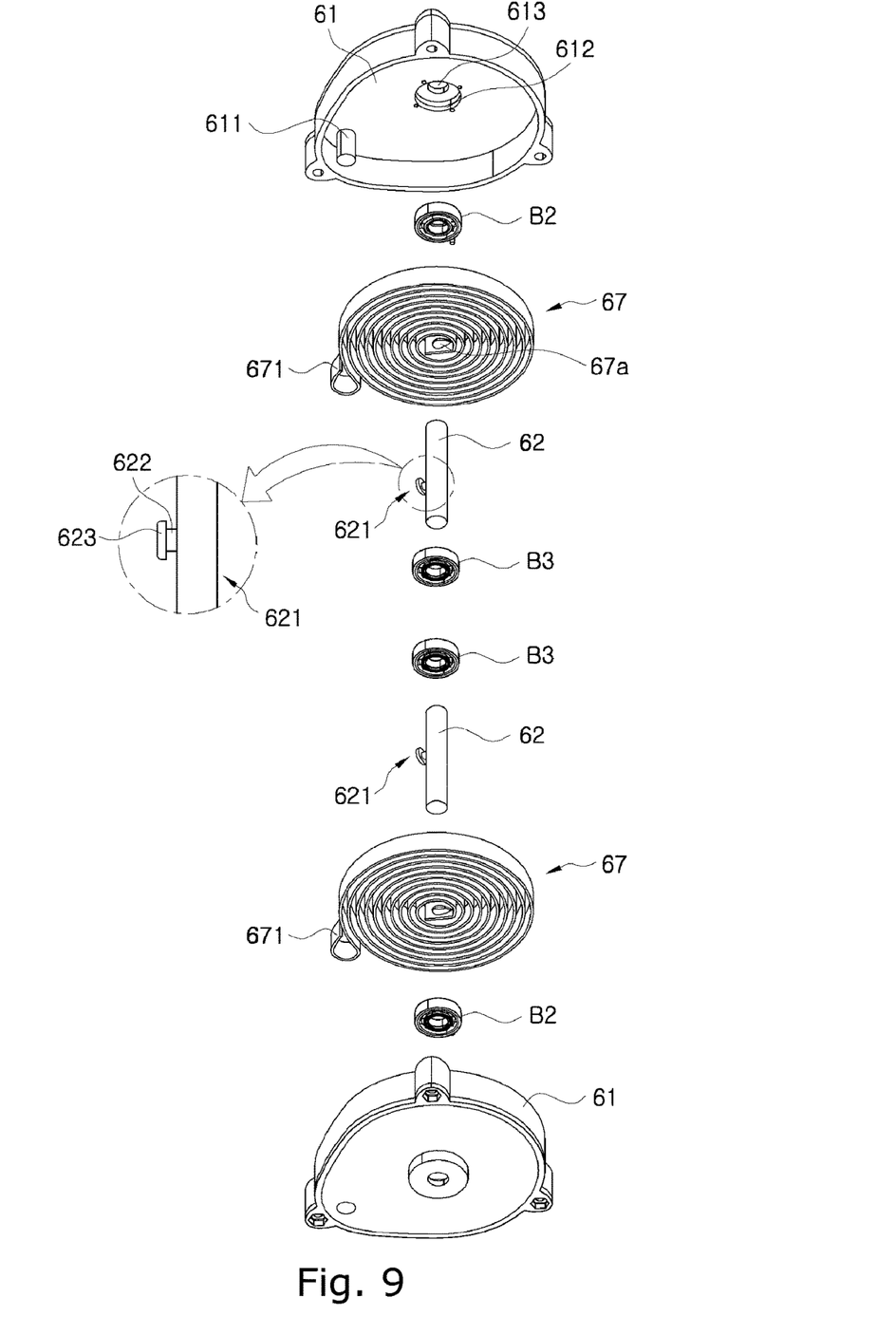
FIG. 9 is an exploded perspective view showing housings, power transfer shafts, and return units applied to the bicycle according to the present invention.
Figure 10:
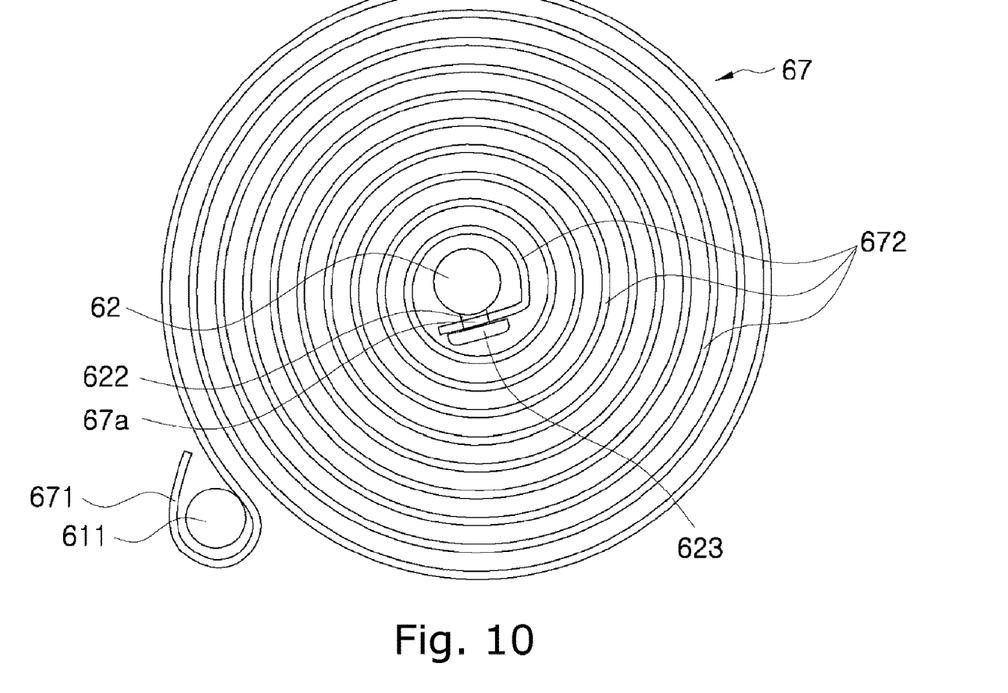
FIG. 10 is a front view showing the non-operating state of the return unit applied to the bicycle according to the present invention.
Figure 11:
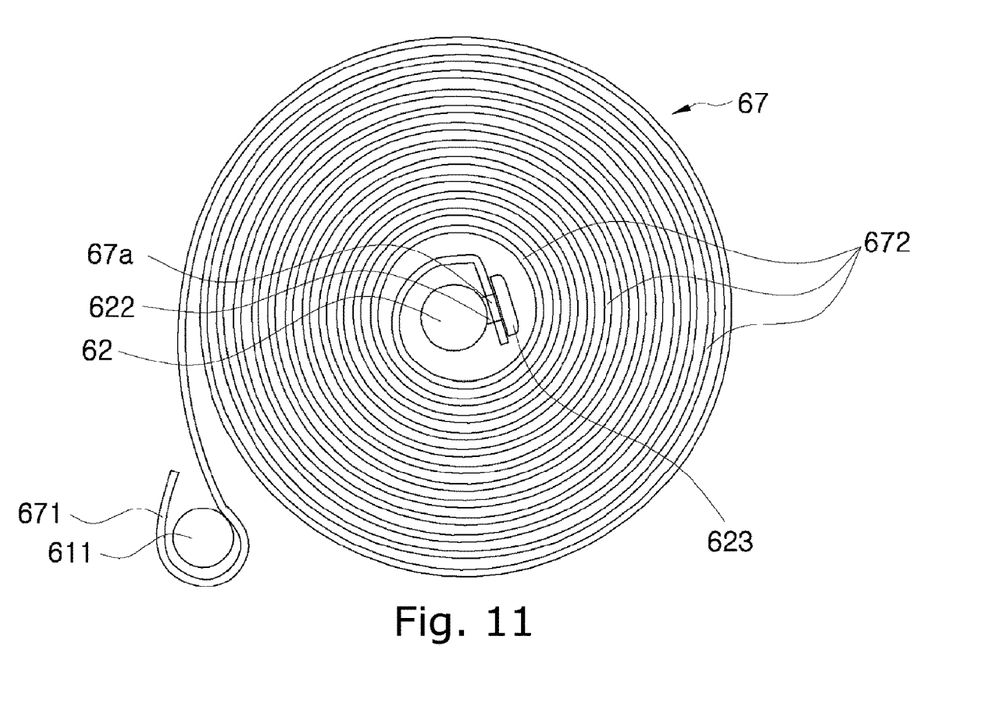
FIG. 11 is a front view showing the operating state of the return unit applied to the bicycle according to the present invention.

FIG. 1 is a perspective view showing a bicycle according to the present invention, FIG. 2 is a plan view showing the bicycle according to the present invention, FIG. is a perspective view showing a body applied to the bicycle according to the present invention, FIG. 4 is an exploded perspective view showing power generation units and pedals applied to the bicycle according to the present invention, FIG. 5 is an assembled perspective view showing the power generation units and the pedals applied to the bicycle according to the present invention, FIG. 6 is a perspective view showing a state in which the power generation units and power transfer units applied to the bicycle according to the present invention are coupled to the body, FIG. 7 is a perspective view showing a state in which the power generation units and the power transfer units applied to the bicycle according to the present invention are coupled to one another, FIG. 8 is an exploded perspective view showing the power transfer units applied to the bicycle according to the present invention, FIG. 9 is an exploded perspective view showing housings, power transfer shafts, and return units applied to the bicycle according to the present invention, FIG. 10 is a front view showing the non-operating state of the return unit applied to the bicycle according to the present invention, and FIG. 11 is a front view showing the operating state of the return unit applied to the bicycle according to the present invention.

The bicycle 1 according to the present invention includes a body 10, a front wheel 20, a rear wheel 30, first driven units 40, power generation units 50, and power transfer units 60.

The body 10 is formed by installing a saddle 11 configured to support the buttocks of a user and well-known handlebars 12 configured to control the traveling direction of a bicycle 1, on a frame.

The saddle 11 is made of material that can provide a comfortable cushion feeling, and is adjustable in height in order to enable a user to freely perform pedaling in a sitting position.

The front wheel 20 and the rear wheel 30 are rotatably disposed on the front and rear sides of the body 10, respectively. The front wheel 20 is rotatably coupled between the lower ends of the pair of blades of a front fork 13 that is fastened to the handlebars 12 and that is rotated in response to the left or right rotation of the handlebars 12.

Furthermore, the rear wheel 30 is rotatably coupled between the lower ends of the pair of blades of a rear fork 14 that is disposed on the rear side of the body 10 in a downwardly inclined form.

Furthermore, coupling plates 15 configured such that the housings 61 of the power transfer units 60 to be described later are coupled thereto are formed on the rear fork 14.

The coupling plates 15 will be described in greater detail later in conjunction with the power transfer units 60.

In this case, each of the front wheel 20 and the rear wheel 30 includes a wheel configured to have a plurality of spokes therein and a well-known wheel structure configured to be mounted on the outer circumference of the wheel and to include treads in which a plurality of grooves is formed.

The first driven units 40 receive power from the power transfer units 60 to be described later, and enable the rear wheel 30 to be rotated. Each of the first driven units 40 has a common sprocket structure in which a plurality of teeth is formed around the edge thereof.

In this case, freewheels may be applied as the first driven units 40.

The first driven units 40 include a pair of driven units, are disposed on one side and the other side of the rear wheel 30, respectively, and are mounted on the outer circumference of the rotating shaft 31 axially fastened to the rear wheel 30.

In this case, the first driven units 40, the rotating shaft 31, and the rear wheel 30 are configured to be simultaneously rotated.

Furthermore, it is noted that the bicycle 1 according to the present invention may include a plurality of first driven units 40 having different diameters and different numbers of teeth in order to freely and selectively control the speed of the bicycle.

The power generation units 50 enable power, required for rotation, to be generated at the rear wheel 30, and allow the front wheel 20 to be rotated in conjunction with the rotation of the rear wheel 30. The power generation units 50 may be each formed in one of various shapes, such as a polygonal or circular rod shape, each having a predetermined length and thickness. In the drawings, there is shown an example in which the power generation units 50 are formed in the shape of rectangular rods.

The power generation units 50 include a pair of power generation units, and are disposed on one side and the other side of the rear wheel 30.

A pedal coupling portion 51 configured to be spaced apart from the lower end of the saddle 11 by a predetermined distance is formed at the front end of each of the power generation units 50, and a mounting portion 52 configured to be mounted onto the rotating shaft 31 is formed at the rear end of the power generation unit 50.

First, a pedal 70 configured to perform pedaling is coupled to the pedal coupling portion 51.

The pedal coupling portion 51 may be fabricated separately from the power generation units 50 and then coupled to the power generation unit 50 by welding, or may be formed in an integrated manner during a process of fabricating the pedal coupling portion 51. The pedal coupling portion 51 is placed at a location where a user can easily perform pedaling.

The pedal coupling portion 51 may be formed in one of various shapes, such as an approximately rectangular frame and a fan-shaped frame, and is formed to have a circular sectional shape.

The pedal 70 includes an upper pedal 71 configured such that it is disposed over the pedal coupling portion 51 and a semicircular groove 71a that surrounds the upper part of the pedal coupling portion 51 is formed in the bottom surface thereof and a lower pedal 72 configured such that it is disposed under the pedal coupling portion 51, the top surface thereof comes into contact with the bottom surface of the upper pedal 71, a semicircular groove 72a that surrounds the lower part of the pedal coupling portion 51 is formed in the top surface thereof, and it is coupled to the upper pedal 71 via a coupling device 90, such as a bolt B and a nut N.

Since the groove 71a of the upper pedal 71 is formed in a semicircular shape and the section of the pedal coupling portion 51 is formed in a circular shape, the pedal 70 is configured to be rotated around the pedal coupling portion 51 in a direction toward the front or rear side of the bicycle 1.

Furthermore, a plurality of protrusions configured to prevent a shoe of a user from slipping during pedaling, thereby enabling pedaling to be continuously and smoothly performed, may be formed on the top surface of the upper pedal 71.

Meanwhile, the mounting portion 52 may be fabricated separately from the power generation units 50 and then coupled to the power generation unit 50 by welding, or may be formed in an integrated manner during a process of fabricating the pedal coupling portion 51.

The mounting portion 52 is formed in a ring shape through which a hollow hole is formed, and a bearing B1 configured to be mounted and rotated on the outer circumference of the rotating shaft 31 is accommodated in the hollow hole.

Accordingly, the power generation units 50 may be repeatedly rotated around the rotating shaft 31 in upward and downward directions, and may enable the rear wheel 30 to be rotated by operating the power transfer units 60 during the rotation process.

The power transfer units 60 provide rotating force to the rear wheel 30 through interaction with the power generation units 50, and each include a housing 61, a power transfer shaft 62, a second driven unit 63, a drive unit 64, a rotation drive unit 65, and a return unit 67.

The housing 61 may be formed in a cylindrical shape configured such that one surface thereof is open and an empty space is formed inside the cylindrical shape.

The housings 61 are spaced apart from each other by a predetermined distance on both sides of the rear wheel 30 in such a manner that the edge portions thereof are bolted into the edge portions of the respective coupling plates 15 in the state in which the open portions thereof have come into close contact with the respective coupling plates 15.

In this case, an accommodation depression 612 depressed in the direction of moving away from the rear wheel 30 and a through hole 613 are successively formed in the center portion of each of the housings 61.

Furthermore, an accommodation depression 15a depressed in the direction of approaching the rear wheel 30 and a through hole 15b are successively formed in the center portion of each of the coupling plates 15.

The accommodation depressions 612 and 15a and the through holes 613 and 15b are portions through which the power transfer shafts 62 pass. The accommodation depressions 612 of the housings 61, the accommodation depressions 15a of the coupling plates 15, the through holes 613 of the housings 61, and the through holes 15b of the coupling plates 15 are located along a horizontal line so that the power transfer shafts 62 can be rotated in the state of being completely level.

Furthermore, bearings B2 and B3 are accommodated in the accommodation depressions 612 and 15a of the housings 61 and the coupling plates 15, and both sides of the power transfer shafts 62 are connected in the state of passing through the bearings B2 and B3. The power transfer shafts 62 are configured to be rotated in place in the state in which one side and the other side of each of the power transfer shafts 62 protrude from corresponding sides of the corresponding one of the housings 61 and the corresponding one of the coupling plates 15.

In this case, a freewheel 100 is mounted on the outer circumference of each of the power transfer shafts 62, and the freewheel 100 is mounted in the center portion of the second driven unit 63, thereby allowing the second driven unit 63 to be rotated only in a single direction.

In this case, the freewheel 100 is the same as a freewheel that is applied to a common bicycle, and thus a detailed description thereof will be omitted.

The second driven units 63 transfer rotating power to the first driven units 40, and each have a common sprocket structure in which a plurality of teeth is formed around the edge thereof.

In this case, freewheels may be applied as the second driven units 63.

The second driven units 63 include a pair of second driven units, are disposed on one side and the other side of the rear wheel 30, and are mounted on the outer circumferences of the power transfer shafts 62 projected through corresponding sides of the coupling plates 15.

Accordingly, each of the first driven units 40 and the corresponding one of the second driven units 63 are connected to each other by a single connection member 66 in the state of being aligned with each other, and thus the corresponding one of the power transfer shafts 62, the second driven unit 63, and the first driven unit 40 are simultaneously rotated.

In this case, chains configured to be rotated while forming continuous tracks around the first driven units 40 and the second driven units 63 may be applied as the connection members 66.

The drive units 64 transfer rotating power to the second driven units 63, and each have a common sprocket structure in which a plurality of teeth is formed around the edge thereof.

The drive units 64 include a pair of drive units, are disposed on one side and the other side of the rear wheel 30, and are mounted on the outer circumferences of the power transfer shafts 62 protruding through corresponding sides of the housings 61.

Furthermore, each of the drive units 64 and the corresponding one of the power transfer shafts 62 are configured to be simultaneously rotated.

In this case, it is noted that the first driven units 40, the second driven unit 63, and the drive unit 64 may be replaced with pulleys in place of sprockets, in which case the connection members 66 may be replaced with belts.

The rotation drive units 65 are conjunctively operated and rotate the drive units 64 when the power generation units 50 are rotated in downward directions. The rotation drive units 65 may be formed as well-known chains.

The upper parts of the rotation drive units 65 are fastened in the state of being wound around the outer circumferences of the drive units 64, and the lower sides of the rotation drive units 65 are bolted to flanges 53 formed on the top surfaces of the power generation units 50.

In one example, each of the rotation drive units 65 may be wound around about ¾ of the outer circumference of the corresponding one of the drive units 64, and one end of the rotation drive unit 65 may be coupled to the drive unit 64 by welding or bolting.

Accordingly, the rotation drive units 65 are also lowered when the power generation units 50 are rotated in downward directions by the pedaling of a user, and rotate the drive units 64.

Furthermore, the power transfer shafts 62, the second driven units 63, the first driven units 40, the rotating shafts 31, and the rear wheel 30 are rotated together by the rotation of the drive units 64, thereby enabling the bicycle to run.

The return units 67 automatically return the power transfer shafts 62 and the power generation units 50 to their original states when the power transfer shafts 62 are rotated as the power generation units 50 are rotated in downward directions. The return units 67 may be formed by winding rectangular belts having a predetermined length, width, and thickness and made of elastic material in the form of coils.

In this case, the return units 67 may be made of metal material. The return units 67 each have a plurality of wall portions 672 that have a diameter gradually increasing from an inner side to an outer side and are spaced apart from each other by a predetermined distance as the return units 67 are wound in the form of coils.

The return units 67 are maintained in the state of being fastened to the power transfer shafts 62 and the housings 61 by first fastening members 621 and second fastening members 611.

The first fastening members 621 each include a body 622 formed at the center portion of the external surface of the corresponding one of the power transfer shafts 62 and a head 623 formed to be inclined at one end of the body 622 and configured such that the lower end thereof is bent toward the power transfer shaft 62 and is fitted and fastened into a through hole 67a formed at the inner end of the corresponding one of the return units 67.

The second fastening members 611 may be formed in the shape of circular pins, and are each formed on one side of the inner space of the corresponding one of the housings 61 at an eccentric location.

Furthermore, rings 671 configured to be mounted around the outer circumferences of the second fastening members 611 are formed at the outer ends of the return units 67.

In this case, the rings 671 may be formed by bending ends of the return units 67 so that the ends of the return units 67 come into contact with the other portions of the return units 67.

Furthermore, the rings 671 are partially disposed in empty spaces formed between the second fastening members 611 and the inner walls of the housings 61.

Each of the return units 67 is wound in the state in which the wall portions 672 come close to each other, as shown in FIG. 11, when a user rotates the corresponding one of the power transfer shafts 62 by pressing the corresponding one of the upper pedals 71 with his or her foot in a downward direction and thus rotating the corresponding one of the power generation units 50 in a downward direction.

In contrast, when external force applied to the power generation units 50 is released by lifting the foot pressing on the upper pedal 71 in an upward direction, the return unit 67 is restored to its original shape by elastic force, as shown in FIG. 10, and thus the power transfer shaft 62 is rotated and restored to its original state and the power generation unit 50 is rotated in an upward direction, thereby enabling pedaling to be repeated.

Additionally, the bicycle 1 according to the present invention further includes a rotation range limiting unit 80 configured to allow the upward and downward rotation of the power generation units 50 only within a predetermined region by limiting the range of the upward and downward rotation of the power generation units 50.

The rotation range limiting unit 80 includes a rotation guide 81, horizontal bars 82, and elevation control members 83.

The upper end of the rotation guide 81 is coupled to the body 10, and is located between the power generation units 50.

The rotation guide 81 may be formed in the shape of a rectangular frame the front and rear surfaces of which are open and in which an empty space is formed.

In other words, the rotation guide 81 includes a left wall 813 and a right wall 814 spaced apart by a predetermined distance in a horizontal direction and an upper horizontal portion 815 and a lower horizontal portion 816 formed between the upper or lower ends of the left wall 813 and the right wall 814 in an integrated form and spaced apart from each other in a vertical direction.

In this case, the left wall 813 and the right wall 814 are formed in a shape protruding toward the front side of the body 10 in order to allow the elevation control members 83 to be smoothly and selectively elevated and lowered when the power generation units 50 configured to be rotated in upward and downward directions are rotated.

Furthermore, pluralities of vertical reinforcing bars 811 and horizontal reinforcing bars 812 are formed to cross each other inside the rotation guide 81 in vertical and horizontal directions in order to enhance rigidity to prevent the rotation guide 81 from being bent or deformed.

The horizontal bars 82 are projected toward corresponding sides of the power generation units 50, i.e., the body 10, and parts of the horizontal bars 82 face the left wall 813 and right wall 814 of the rotation guide 81.

Furthermore, each of the elevation control members 83 includes a pair of rotation guide shafts 831 disposed on the corresponding one of the horizontal bars 82 and rollers 832 mounted around the outer circumferences of the rotation guide shafts 831 to be rotated in place.

The rotation guide shafts 831 are disposed on the horizontal bar 82 to be spaced apart from each other by a predetermined distance, and are configured to be spaced apart from both sides of the left wall 813 and both sides of the right wall 814 by a predetermined distance.

Furthermore, the rollers 832 are mounted around the rotation guide shafts 831, and thus come into contact with the left wall 813 and the right wall 814.

Accordingly, when the power generation units 50 are rotated in upward and downward directions through pedaling, the rollers 832 are selectively elevated and lowered while being smoothly rotated along the left wall 813 and the right wall 814, thereby preventing the power generation units 50 from being moved in lateral directions.

Additionally, the rollers 832 repeatedly come into contact with the bottom surface of the upper horizontal portion 815 and the top surface of the lower horizontal portion 816 during the elevating and lowering process, thereby constraining the power generation units 50 to be repeatedly rotated only within an area between the upper horizontal portion 815 and the lower horizontal portion 816.

Furthermore, the rollers 832 are made of rubber or silicon material in order to minimize noise that is generated during a process in which the rollers 832 are selectively elevated and lowered along the left wall 813 and the right wall 814 and in the case where the rollers 832 collide with the upper horizontal portion 815 or the lower horizontal portion 816.

Next, the operation of the bicycle according to the present invention and unique effects generated during the operation will now be described.

First, when a user rotates the power generation unit(s) 50 in a downward direction by applying external force to each or both of the pedals 70 coupled to the power generation units 50 located on the right and left sides of the body 10 in the state in which the user sits on the saddle 11, the rotation drive unit(s) 65 are also rotated and rotate the drive unit(s) 64.

Accordingly, the power transfer shaft(s) 62 connected to the drive unit(s) 64 is rotated in the same direction as the drive unit(s) 64, and thus the second driven unit(s) 63, the first driven unit(s) 40, the rotating shaft(s) 31, and the rear wheel 30 are rotated together, thereby enabling the bicycle to run.

Furthermore, each of the return units 67 is wound around the external surface of the corresponding one of the power transfer shafts 62 when the corresponding one of the power generation units 50 is rotated in a downward direction and the power transfer shaft 62 is rotated, and is restored to its original shape by elastic force, rotates and restores the power transfer shaft 62 to its original state and rotates the power generation units 50 in an upward direction when external force applied to the power generation units 50 is released, thereby enabling pedaling to be repeatedly performed.

In this case, when the power generation unit 50 is rotated in a downward direction, the pedal 70 becomes a load, the lower end of the rotation drive unit 65 coupled to the power generation unit 50 via the flange 53 becomes an effort, and the rotating shaft 31 becomes a fulcrum.

Accordingly, as the power generation units 50 rotate the rear wheel 30 by means of the principle of the lever, the bicycle may be run with a small amount of force, thereby improving the convenience of use, such as enabling not only common adults but also the elderly, women, and children, who are relatively weak in force, to use the bicycle.

In this case, the second driven units 63 are formed to have a larger diameter than the first driven units 40 and to have a larger number of teeth than the first driven units 40 in order to increase the RPM and rotation speed of the first driven units 40.

Therefore, a user can increase the RPM and rotation speed of the rear wheel 30 by performing pedaling about first two or three times after sitting on the bicycle 1, thereby increasing the traveling speed of the bicycle 1 within a few seconds. Furthermore, high propelling force can be generated at the rear wheel by performing pedaling a small number of times, thereby enabling a user to easily run the bicycle on a slope as well as on a flatland without a large amount of force.

It will be understood by those having ordinary knowledge in the art to which the present invention pertains that the present invention may be practiced in other specific forms without departing from the technical spirit or essential features of the present invention. Therefore, it should be appreciated that the above-described embodiments are illustrative but are not limitative in all aspects. The scope of the present invention is defined by the attached claims rather than the detailed description. It should be interpreted that all alterations or modifications derived from the meanings and scopes of the claims and concepts equivalent to the claims are included in the scope of the present invention.

| * Description of reference symbols * | |
|---|---|
| 1: bicycle | 10: body |
| 11: saddle | 12: handlebars |
| 13: front fork | 14: rear fork |
| 15: coupling plate | 15a, and 612: accommodation depression |
| 15b, 613, and 67a: through hole | 20: front wheel |
| 30: rear wheel | 31: rotating shaft |
| 40: first driven units | 50: power generation units |
| 51: pedal coupling portion | 52: mounting portion |
| 53: flange | 60: power transfer units |
| 61: housing | 611: second fastening member |
| 62: power transfer shaft | 621: first fastening member |
| 622: body | 623, and 671: head |
| 63: second driven unit | 64: drive unit |
| 65: rotation drive unit | 66: connection member |
| 67: return unit | 672: wall portions |
| 70: pedal | 71: upper pedal |
| 71a: groove | 72: lower pedal |
| 80: rotation range limiting unit | 81: rotation guide |
| 811: vertical reinforcing bar | 812: horizontal reinforcing bar |
| 813: left wall | 814: right wall |
| 815: upper horizontal portion | 816: lower horizontal portion |
| 82: horizontal bar | 83: elevation control member |
| 831: rotation guide shaft | 832: roller |
| 90: coupling device | 100: freewheel |

The invention claimed is:

1. A bicycle, comprising:

a body with a saddle and handlebars;

a front wheel and a rear wheel disposed on front and rear sides of the body, respectively;

a pair of first driven units disposed on one side and remaining side of the rear wheel, respectively, and mounted around a rotating shaft axially fastened into the rear wheel;

a pair of power generation units disposed on the one side and remaining side of the rear wheel, respectively, and mounted around the rotating shaft to be rotatable in upward and downward directions; and power transfer units disposed on the one side and remaining side of the rear wheel, respectively, connected to the first driven units and the power generation units, and configured to, when the power generation units are rotated in the downward directions, be rotated and transfer rotating power to the first driven units, wherein each of the power transfer units comprises:

a housing disposed to be spaced apart from the rear wheel by a predetermined distance, and formed such that one side thereof is open and an empty space is formed therein;

a power transfer shaft disposed to pass through a center portion of the housing;

a second driven unit mounted around one side of the power transfer shaft, and configured to be connected to a corresponding one of the first driven units via a connection member and to transfer rotating force to the first driven unit;

a drive unit mounted around a remaining side of the power transfer shaft; and a rotation drive unit connected to the drive unit and the power generation unit, and configured to, when the power generation unit is rotated in the downward direction, rotate the drive unit, thereby enabling the power transfer shaft, the second driven unit, the first driven unit, the rotating shaft, and the rear wheel to be rotated, wherein the power transfer unit further comprises a return unit accommodated in an inner space of the housing, wound around an external surface of the power transfer shaft in a coil form, and configured to, when the power transfer shaft is rotated in response to the downward rotation of the power generation unit, return the power transfer shaft and the power generation unit to their original states.

2. The bicycle of claim 1, wherein:

a first fastening member configured to pass through and be fastened into an inner end of the return unit is formed on the external surface of the power transfer shaft; and a second fastening member configured to be inserted into a ring formed at an outer end of the return unit is formed in the inner space of the housing.

3. The bicycle of claim 1, wherein:

coupling plates disposed on the one side and remaining side of the rear wheel and coupled to corresponding surfaces of the housings are formed on the body;

accommodation depressions and through holes configured such that the power transfer shafts pass therethrough are formed in the housings and the coupling plates, respectively; and bearings configured to guide the power transfer shaft through movement in place are accommodated in the accommodation depressions of the housings and the coupling plates.

4. The bicycle of claim 1, wherein the second driven unit is formed to have a larger diameter than the first driven units in order to increase RPM and rotation speed of the first driven units.

5. The bicycle of claim 1, wherein:

pedal coupling portions configured such that pedals are coupled thereto are formed at one-side ends of the power generation units; and each of the pedals comprises:

an upper pedal configured such that it is disposed over the pedal coupling portion and a semicircular groove that surrounds an upper part of the pedal coupling portion is formed in a bottom surface thereof; and a lower pedal configured such that it is disposed under the pedal coupling portion, a semicircular groove that surrounds a lower part of the pedal coupling portion is formed in a top surface thereof, and it is coupled to the upper pedal via a coupling device.

6. The bicycle of claim 1, further comprising a rotation range limiting unit configured to limit an upward and downward rotation range of the power generation units;
wherein the rotation range limiting unit comprises:
a rotation guide coupled to the body and located between the power generation units;
horizontal bars configured to protrude from corresponding sides of the power generation units and to face the rotation guide; and
elevation control members each configured to include two members disposed on each of the horizontal bars, configured to come into contact with inner and outer surfaces of the rotation guide, and configured to, when the power generation units are rotated in the upward and downward directions, come into contact with a top or bottom surface of the rotation guide while being selectively elevated and lowered along the rotation guide, thereby limiting the selective elevation and lowering of the power generation units.

7. The bicycle of claim 6, wherein the elevation control members are coupled to the horizontal bars to be rotatable in place, and the elevation control members are made of rubber or silicon material in order to prevent noise that is generated in a process in which the elevation control members are selectively elevated and lowered along the body and in a case in which the elevation control members come into contact with a ceiling or bottom surface of the body.

* * * * *